(12) United States Patent
Murakami et al.

(10) Patent No.: US 9,154,578 B2
(45) Date of Patent: Oct. 6, 2015

(54) DISPLAY DEVICE WITH SCALING OF SELECTED OBJECT IMAGES

(75) Inventors: Keiichi Murakami, Tokyo (JP); Dai Kamiya, Tokyo (JP); Yasushi Onda, Tokyo (JP); Izua Kano, Tokyo (JP); Kazuhiro Yamada, Tokyo (JP); Naoki Hashida, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 83 days.

(21) Appl. No.: 13/003,422

(22) PCT Filed: Sep. 7, 2009

(86) PCT No.: PCT/JP2009/065567
§ 371 (c)(1),
(2), (4) Date: Jan. 10, 2011

(87) PCT Pub. No.: WO2010/027068
PCT Pub. Date: Mar. 11, 2010

(65) Prior Publication Data
US 2011/0148933 A1    Jun. 23, 2011

(30) Foreign Application Priority Data
Sep. 5, 2008   (JP) .................... 2008-228833

(51) Int. Cl.
*G09G 5/00*       (2006.01)
*H04L 29/08*      (2006.01)
*G06F 3/0481*     (2013.01)
*H04M 1/725*      (2006.01)

(52) U.S. Cl.
CPC .............. *H04L 67/36* (2013.01); *G06F 3/0481* (2013.01); *H04M 1/72544* (2013.01)

(58) Field of Classification Search
None
See application file for complete search history.

(56) References Cited

U.S. PATENT DOCUMENTS

| 5,463,726 A * | 10/1995 | Price ............................ 715/797 |
| 5,499,334 A * | 3/1996 | Staab ............................ 715/778 |
| 5,742,285 A * | 4/1998 | Ueda ............................ 715/778 |
| 5,835,088 A * | 11/1998 | Jaaskelainen, Jr. ............ 715/803 |
| 6,215,490 B1 * | 4/2001 | Kaply ........................... 715/788 |
| 6,473,088 B1 * | 10/2002 | Matsumoto et al. .......... 345/530 |
| 6,826,729 B1 * | 11/2004 | Giesen et al. ................. 715/837 |
| 7,665,033 B2 * | 2/2010 | Byrne et al. .................. 715/782 |

(Continued)

FOREIGN PATENT DOCUMENTS

| JP | 06-266330 | 9/1994 |
| JP | 07-093122 | 4/1995 |

(Continued)

*Primary Examiner* — Stephen R Koziol
*Assistant Examiner* — Jason Pringle-Parker
(74) *Attorney, Agent, or Firm* — MKG, LLC

(57) ABSTRACT

In a communication terminal device, in a case where the arrangement of the windows is changed in a list screen, an overhead screen is initially displayed, in which the list screen is overviewed, and the arrangement of the windows is subsequently changed in the overhead screen, and a magnified screen (original screen) of the overhead screen, in which the arrangement of the windows has been changed, is displayed last, as described in the foregoing. By displaying a magnified image, it is possible to make windows better visible in a small display area of a mobile phone. Also, in a case where a window exists that cannot be displayed in a magnified screen, by displaying an overhead screen, it becomes possible for a user to recognize a fact that a window that cannot be displayed exists in a magnified screen, and also recognize a position of the window.

21 Claims, 8 Drawing Sheets

(56) References Cited

U.S. PATENT DOCUMENTS

| | | | |
|---|---|---|---|
| 8,146,016 B2* | 3/2012 | Himberger et al. | 715/825 |
| 8,243,198 B2* | 8/2012 | Lee et al. | 348/588 |
| 8,276,095 B2* | 9/2012 | Cutler et al. | 715/804 |
| 2002/0123368 A1* | 9/2002 | Yamadera et al. | 455/556 |
| 2004/0100479 A1* | 5/2004 | Nakano et al. | 345/700 |
| 2004/0179026 A1* | 9/2004 | Rix | 345/660 |
| 2004/0261037 A1* | 12/2004 | Ording et al. | 715/788 |
| 2005/0149879 A1* | 7/2005 | Jobs et al. | 715/796 |
| 2005/0240661 A1* | 10/2005 | Heller et al. | 709/219 |
| 2006/0015823 A1* | 1/2006 | Chao et al. | 715/823 |
| 2007/0035513 A1* | 2/2007 | Sherrard et al. | 345/157 |
| 2008/0115081 A1* | 5/2008 | Sankaravadivelu et al. | 715/783 |
| 2008/0202823 A1* | 8/2008 | Won et al. | 178/18.01 |
| 2008/0204402 A1* | 8/2008 | Hirata et al. | 345/156 |
| 2009/0070677 A1* | 3/2009 | Kim et al. | 715/719 |
| 2009/0100462 A1* | 4/2009 | Park et al. | 725/38 |
| 2010/0313156 A1* | 12/2010 | Louch et al. | 715/769 |
| 2010/0313164 A1* | 12/2010 | Louch et al. | 715/790 |
| 2010/0313165 A1* | 12/2010 | Louch et al. | 715/792 |

FOREIGN PATENT DOCUMENTS

| | | |
|---|---|---|
| JP | 2003-280630 | 10/2003 |
| JP | 2007-122633 | 5/2007 |

* cited by examiner

DISPLAY DEVICE WITH SCALING OF SELECTED OBJECT IMAGES

TECHNICAL FIELD

The present invention relates to a GUI (Graphical User Interface).

BACKGROUND

A multi-window system, in which plural windows can be displayed, is known. In a case where the multi-window system is applied to an electronic device such as a mobile phone, an operation to select a window can be inconvenient. For example, in an electronic device that does not have a pointing device such as a mouse for selecting a position (coordinate), an operation to select a desired window is likely to be inconvenient if the number of windows displayed increases.

Also, in a case of an electronic device such as a mobile phone that has a small display area, if all displayable windows are displayed, the size of each window has to be smaller, which makes it difficult for a user to recognize a content of each window. Conversely, if each window is displayed in an appropriate size so that a user is able to recognize a content of the window, not all displayable windows can be displayed, and only some of the windows is displayed. As described in the foregoing, if the multi-window system is applied to an electronic device having a small display area, a case may occur in which it is difficult for a user to select a desired window from among plural windows.

As a technique for improving operability in the multi-window system, a technique described in JP 2003-280630 A and JP 2007-122633 A is known. The technique described in JP 2003-280630 A and JP 2007-122633 A is a technique by which a special window is displayed in a display area and displayed in the special window is an overhead screen showing the arrangement of all windows including any hidden windows.

SUMMARY

However, in the technique described in JP 2003-280630 A and JP 2007-122633 A, it is possible to recognize easily an image of the entire screen in which plural windows are arranged; however, an operation to select a desired window is likely to be inconvenient. Also, in a small display area of a mobile phone, there is no room for providing a window showing an overhead screen.

In view of the above problems, it is one object of the present invention to provide a technique, in a case where images of plural windows can be displayed and a display area is small, for reducing the burden placed on a user when s/he selects a desired image.

An information-processing device according to the present invention comprises: an object image displaying means for causing a display means for displaying an image to display at least a part of an object image group including plural object images in a size corresponding to a first scale; a display position change means for, if an operation means for receiving an operation instruction receives an operation instruction to change a display position of an object image of the object image group, causing the display means to display the object image group including the object image whose display position has been changed, in a size corresponding to a second scale that is smaller than the first scale, and thereafter causing the display means to display at least a part of the object image group including the object image whose display position has been changed, in the first scale size; and a processing executing means for, if the operation means receives an operation instruction to select an object image displayed on the display means in a size corresponding to the first scale, executing a processing corresponding to the selected object image.

In the information-processing device according to the present invention, the display position change means may determine whether all the plural object images of the object image group including the object image whose display position has been changed, can be displayed on the display means in a size corresponding to the first scale, and if the determination is negative, cause the display means to display the object image group including the object image whose display position has been changed, in a size corresponding to the second scale, and thereafter cause the display means to display at least a part of the object image group including the object image whose object image has been changed, in the first scale size.

The information-processing device according to the present invention may comprise a selection means for selecting at least one of the plural object images, and the object image displaying unit may display at least a part of the object image group so that all object images that have been selected by the selection means are displayed on the display means, and the display position change means may display at least a part of the object image group so that all object images that have been selected by the selection means are displayed on the display means.

In the information-processing device according to Claim 1, the display position change means may change a size of the object image group from the first scale to the second scale by zooming out the object image group, and change the size of the object image group from the second scale to the first scale by zooming in the object image group.

A program according to the present invention causes a computer to function as the above information-processing device. Also, a program according to the present invention may be downloaded to a computer via a network such as the Internet, and installed in the computer so that the program can be used. Also, the present invention may be implemented in an embodiment of a recording medium such as an optical disk storing such a program.

According to the present invention, in a case where images of plural windows can be displayed and a display area is small, it is possible to reduce the burden placed on a user when s/he selects a desired image.

DETAILED DESCRIPTION

Figure 1:
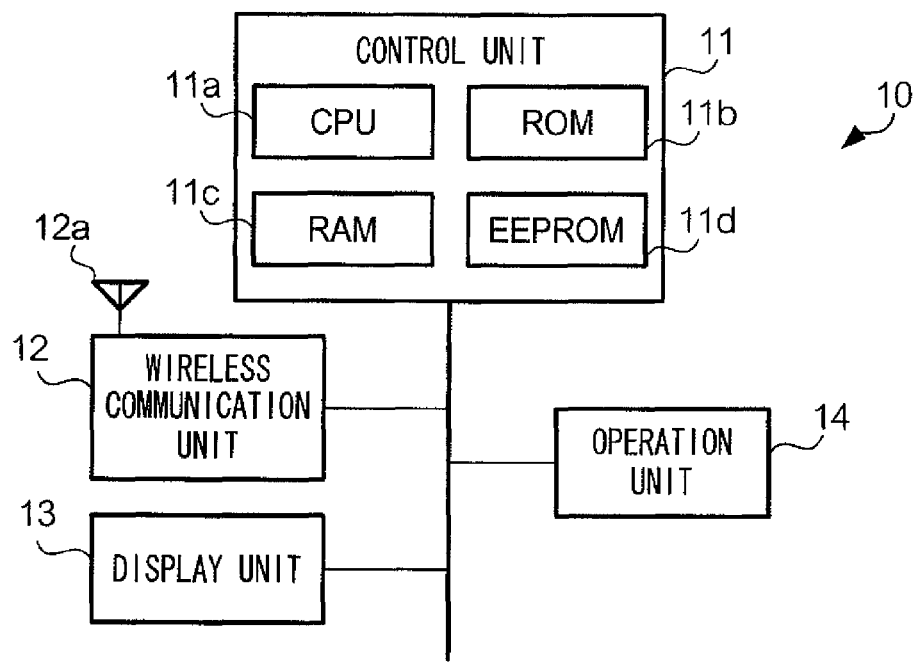
FIG. 1 is a block diagram showing a physical configuration of a communication terminal device.

FIG. 1 is a block diagram showing a physical configuration of a communication terminal device according to an embodiment of the present invention. It is to be noted that communication terminal device 10 according to the present embodiment is a mobile phone having a means for inputting and outputting a voice (not shown) such as a microphone and a speaker. Control unit 11 includes CPU (Central Processing Unit) 11a, ROM (Read Only Memory) 11b, RAM (Random Access Memory) 11c, and EEPROM (Electronically Erasable and Programmable ROM) 11d, and CPU 11a executes a program stored in ROM 11b or EEPROM 11d while using RAM 11c as a work area, thereby controlling an operation of each unit of communication terminal device 10. Wireless communication unit 12 includes antenna 12a, and performs wireless data communication with a predetermined mobile communication network. Display unit 13 includes a liquid crystal display and a liquid crystal driving circuit, and displays an image in a predetermined display area based on display data provided from control unit 11. Operation unit 14 includes plural keys, and provides operation information to control unit 11, which corresponds to a press operation by a user. Operation unit 14 includes a key for selecting a window (hereinafter referred to as "direction key"), a key for changing the arrangement of the windows (hereinafter referred to as "change key"), and a key for specifying a window (hereinafter referred to as "determination key"). By operating the keys, a user is able to select a window or change the arrangement of the windows. It is to be noted that the direction key is a key whereby one of four directions of left, right, up, and down is selected in the present embodiment; however, the direction key may be a key whereby a direction other than the four directions, such as an oblique direction (toward upper right or lower left) may be selected. Also, it is to be noted that in the present embodiment a case in which the direction key receives an operation instruction to select a desired direction is described; however, if communication terminal device 10 has a touch panel, the touch panel may receive such an operation instruction.

ROM 11b pre-stores some programs. Hereinafter, the programs will be referred to as "preinstalled programs." The preinstalled programs include a multitask operating system (hereinafter referred to as "multitask OS"), a Java™ platform, and native applications. The multitask OS is an operating system that supports functions such as assignment of a virtual memory space that are necessary to realize pseudo-parallel execution of plural tasks. The Java platform is a set of programs that are described in accordance with a CDC (Connected Device Configuration), which is a configuration for realizing Java Runtime Environment 130 (described later) in communication terminal device 10 in which the multitask OS is installed. The native applications are programs for realizing a basic function of communication terminal device 10 such as a telephone call.

EEPROM 11d includes Java application storage areas for storing Java applications. A Java application includes a JAR (Java Archive) file that is a combination of a substance program that describes a procedure in a Java Runtime Environment, and image files or audio files that are used when the substance program is executed; and an ADF (Application Descriptor File) in which properties of installation and start-up of the JAR file are described. The Java application is prepared by a content provider or a carrier, and stored in an external server device, and can be downloaded from the server device on request by communication terminal device 10.

Figure 2:
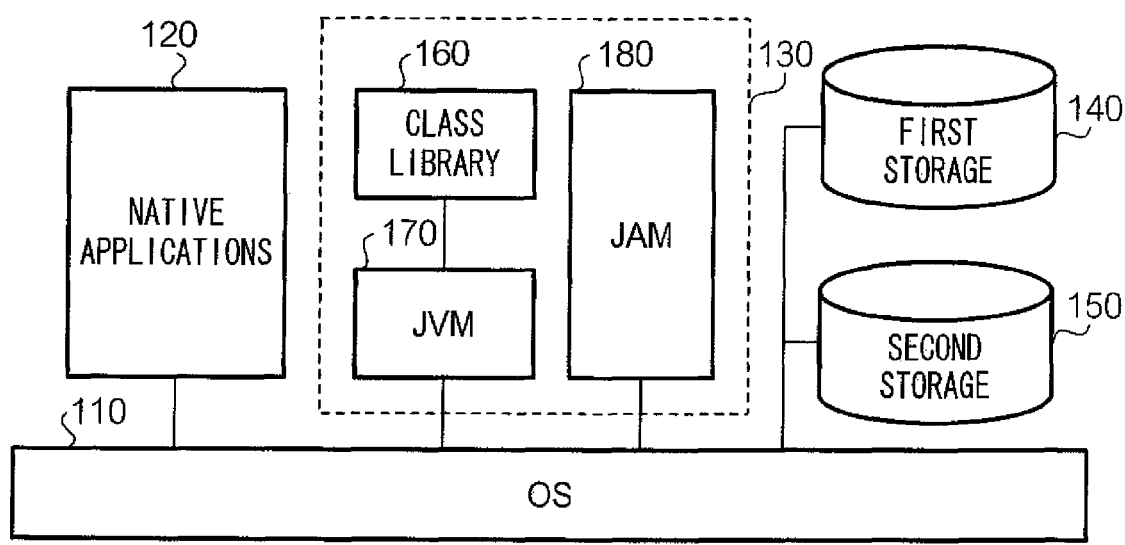
FIG. 2 is a diagram showing a logical configuration of a communication terminal device.

FIG. 2 is a diagram showing a logical configuration of units realized by control unit 11 of communication terminal device 10 by executing programs stored in ROM 11b and EEPROM 11d. As shown in the drawing, in communication terminal device 10 that executes the programs, native applications 120 and Java Runtime Environment 130 are realized in OS 110, and first storage 140 and second storage 150 are secured in EEPROM 11d.

Java Runtime Environment 130 is realized by use of the Java platform stored in ROM 11b. Java Runtime Environment 130 includes class library 160, JVM (Java Virtual Machine) 170, and JAM (Java Application Manager) 180. Class library 160 is a file of a combination of program modules (classes) that have a particular function. JVM 170 is a Java Runtime Environment that is optimized for the CDC described above, and has a function of interpreting and executing byte codes provided as a Java application. JAM 180 has a function of managing downloading, installation, start-up, and termination of Java applications.

First storage 140 is an area for storing Java applications, each of which includes a JAR file and an ADF, which are downloaded under control of JAM 180. Second storage 150 is an area in which an individual storage area is assigned to each installed Java application, and is used for storing data generated during running of Java applications after the applications are terminated. Data of a certain Java application in a storage area assigned to the Java application can be rewritten only when the application is running; therefore, the data cannot be rewritten by another Java application.

Java applications of the present embodiment include applications for displaying plural windows. The Java applications for displaying plural windows include a "window display application" and a "widget." The window display application is an application for displaying one or more windows in a display area of display unit 13, and controlling the display aspect. The widget is an application that realizes a predetermined function on the condition that the window display application displays a window.

A "window" of the present embodiment refers to a part of a display area of display unit 13 that is assigned to a widget, which is displayed as an image that can be distinguished from an image in another part of the display area. The window displays certain information, which is an example of an "object image" of the present invention. The shape and size (area) of the window are determined depending on a widget; however, the shape and size of the window may be changed. Also, the window may be moved in accordance with an operation by a user.

In the present embodiment, plural widgets appear, each widget realizing a different function. The widgets include, for example, a widget for displaying a time and date by displaying a clock image in a window (hereinafter referred to as "clock widget"), a widget for displaying characters input by a user in a window as a memorandum (hereinafter referred to as "memo widget"), or a widget for playing a video or music (hereinafter referred to as "play widget"). Also, the widgets may include a widget that obtains information such as news or weather forecast via wireless communication unit 12 at a predetermined time, and displays the obtained information.

The foregoing is a description of the configuration of communication terminal device 10 according to the present embodiment. With the configuration, communication terminal device 10 executes plural applications in accordance with a request by a user. Communication terminal device 10 according to the present embodiment realizes a multi-window system by displaying windows of widgets. Namely, communication terminal device 10 runs a window display application when displaying plural windows. A user is able to select one from among plural windows or change a window that has been selected by operating the direction key of operation unit 14. Control unit 11 selects at least one from among plural windows displayed on display unit 13, or changes a window that has been selected, in accordance with a signal output from operation unit 14. Control unit 11 may select a single window or plural windows. In the following description, a window that has been selected will be referred to as "selected window," and a window that has not been selected will be referred to as "non-selected window" for convenience of explanation. It is to be noted that in the present embodiment the "selection" of a window means providing an input focus to the window.

Communication terminal device 10 puts a widget corresponding to a window that has been selected by a user to a state in which the widget carries out an operation that is different from an operation carried out when the window has not been selected. Namely, each widget is able to carry out different operations depending on whether a window corresponding to the widget has been selected. For example, a clock widget is able to carry out an operation to display a time and date when a corresponding window has not been selected, and is able to carry out an operation to change the time and date or the appearance such as a color of a window when the corresponding window has been selected. A memo widget is able to carry out an operation to display characters when a corresponding window has not been selected, and is able to carry out an operation to change characters when the corresponding window has been selected. A play widget is able to carry out an operation to play a video or music when a corresponding window has not been selected, and is able to carry out an operation to control the volume, or pause or fast-forward a video or music when the corresponding window has been selected. The operations are carried out depending on an operation performed by a user. For example, when a user performs an operation to set a clock, the time is changed accordingly.

When a window display application is running, a user is able to specify a window displayed on display unit 13 by operating the determination key of operation unit 14. If operation unit 14 receives an operation instruction to specify a window displayed on display unit 13, control unit 11 carries out an operation corresponding to the specified window. For example, in a case where a window corresponding to a clock widget is specified, control unit 11 increases the display size of the window and carries out an operation to change the time and date or the appearance, such as a color, of the window.

The window display application can suspend displaying a list of plural windows. For example, in a case where a user starts a telephone call while the window display application is displaying a list, communication terminal device 10 carries out an interrupt processing to change the image displayed on display unit 13 to an image for a telephone call. To do so, control unit 11 of communication terminal device 10 generates display information indicating how plural windows are displayed, and stores the information in EEPROM 11*d*. Control unit 11 updates the display information each time the display of windows changes. The display information includes information indicating windows displayed at the time, information indicating the arrangement of the windows, and information indicating windows selected at the time. The display information also includes identification information identifying the windows. After the telephone call ends, and the user performs a predetermined operation, the window display application resumes the display of the list. Communication terminal device 10 resumes the display of the list in a display aspect similar to a display aspect in which the display of the list was performed before the display was suspended, by referring to display information.

Figure 3:
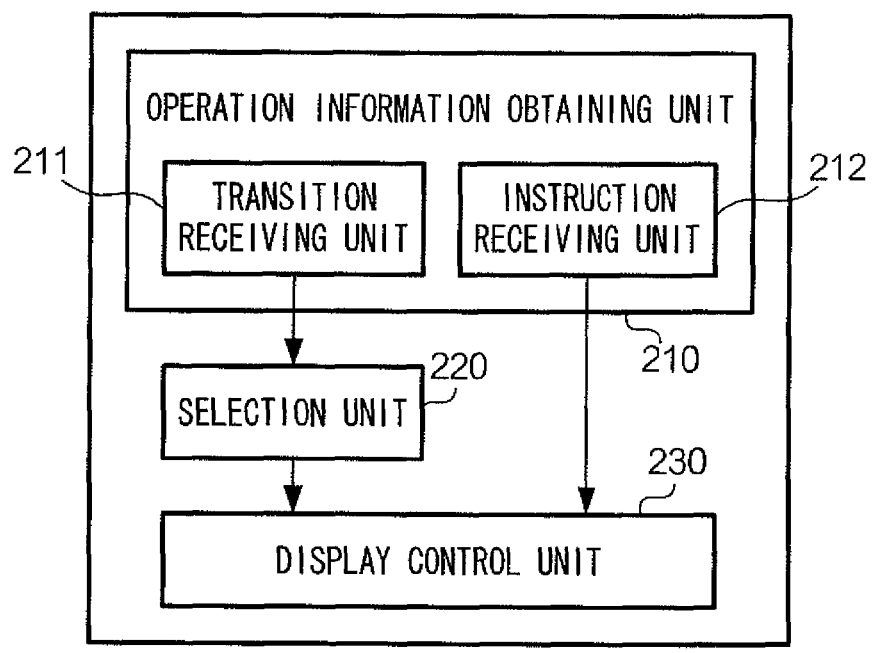
FIG. 3 is a functional block diagram showing functions realized by a communication terminal device.

FIG. 3 is a functional block diagram showing functions realized by control unit 11 of communication terminal device 10 when the control unit displays plural windows (namely, control unit 11 executes a window display application). As shown in the drawing, control unit 11 of communication terminal device 10 realizes functions corresponding to operation information obtaining unit 210, selection unit 220, and display control unit 230 by executing a stored program.

Operation information obtaining unit 210 has a function of obtaining operation information from operation unit 14. Operation information obtaining unit 210 identifies an operation by a user on the basis of a key operated by the user and an operation being carried out by control unit 11. Operation information obtaining unit 210 includes transition receiving unit 211 and instruction receiving unit 212. Transition receiving unit 211 receives an operation instruction to change a selected window. Transition receiving unit 211 functions when a certain window is a selected window and any one of the operation directions is selected using the direction key. Instruction receiving unit 212 receives an instruction to change the arrangement of the windows. Instruction receiving unit 212 functions when plural windows are being displayed and the change key is pressed.

Section unit 220 has a function of, when plural windows are displayed, selecting a selected window from among the plural windows. Selection unit 220, when selecting a selected window, may determine a selected window on the basis of pre-stored display information, or determine a selected window in accordance with an operation by a user. For example, selection unit 220, in a case where transition receiving unit 211 receives an operation instruction to change a selected window, changes a selected window in accordance with the operation. Namely, a function realized by selection unit 220 in this case is a function of changing a selected window from one window to another window. In this case, selection unit 220 identifies an operation direction that has been selected, and specifies a non-selected window that is located in the operation direction relative to a selected window and that is closest to the selected window, as a selected window.

Display control unit 230 has a function of controlling display of a window on the basis of external information. Specifically, display control unit 230 starts or terminates display of a window, or changes a display position of a window on the basis of external information. Display control unit 230 also performs a display control to change display of a window in response to transition of a selected window, and performs a display control to change the arrangement of the windows in response to pressing of the change key. Display control unit 230 displays a selected window and a non-selected window so that they can be distinguished from each other. Specifically, display control unit 230 displays a selected window and a non-selected window in different display aspects.

Figure 4:
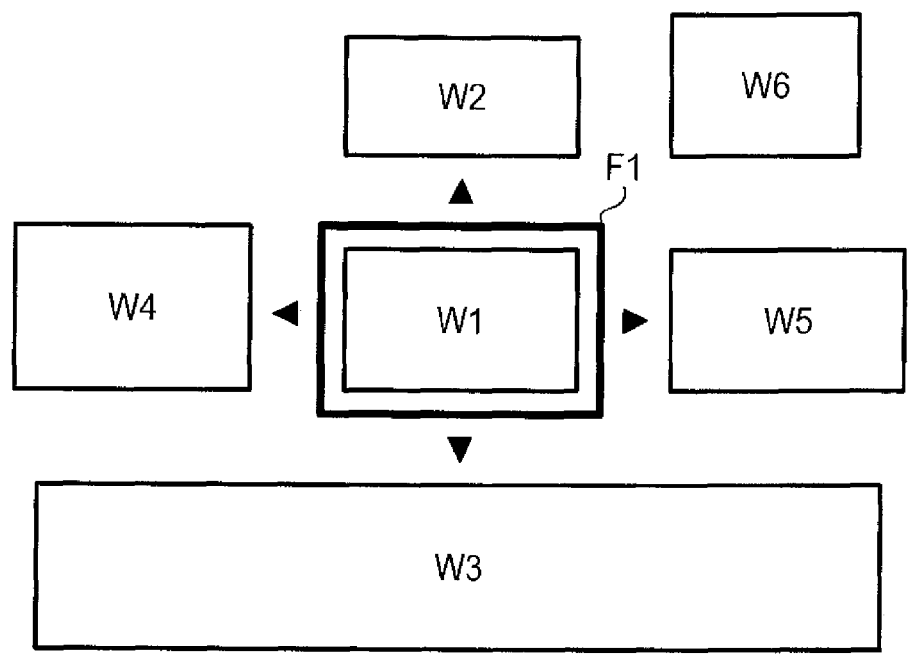
FIG. 4 is a diagram showing an example of display aspects of both a selected window and a non-selected window.

FIG. 4 is a diagram showing an example of display aspects of a selected window and non-selected windows. As shown in the drawing, display control unit 230, in a case where a selected window is window W1, differentiates window W1 from windows W2 to W6, which are non-selected windows, by adding frame F1 to window W1. It is to be noted that a method of differentiating a selected window from a non-selected window is not limited to this example, and a method of blinking a selected window or a method of making a non-selected window appear to be translucent may be employed.

A transition of a selected window is performed on the basis of an operation direction selected using the direction key. For example, in a case where a selected window is window W1, display control unit 230 recognizes that windows W2 to W5, which are located to left, right, up, or down directions relative to window W1, are windows that can be subsequently selected. In this case, if a user selects window W6, a selected window is changed from window W1 to window W2 (or W5), and further changed to window W6. Namely, two transitions have to be performed.

Display control unit 230 may display a predetermined character or image as a mark between a selected window and a window that can be subsequently selected. By performing such a display, it becomes easier for a user to recognize a window that can be subsequently selected. It is to be noted that in a case where there are plural windows that can be subsequently selected in an operation direction as in a case shown in FIG. 4 in which window W3 is a selected window (in this case, plural windows exist in an upper direction), a window is recognized as a window that can be subsequently selected in accordance with a predetermined rule, and a mark is displayed in connection with the window.

Figure 5:
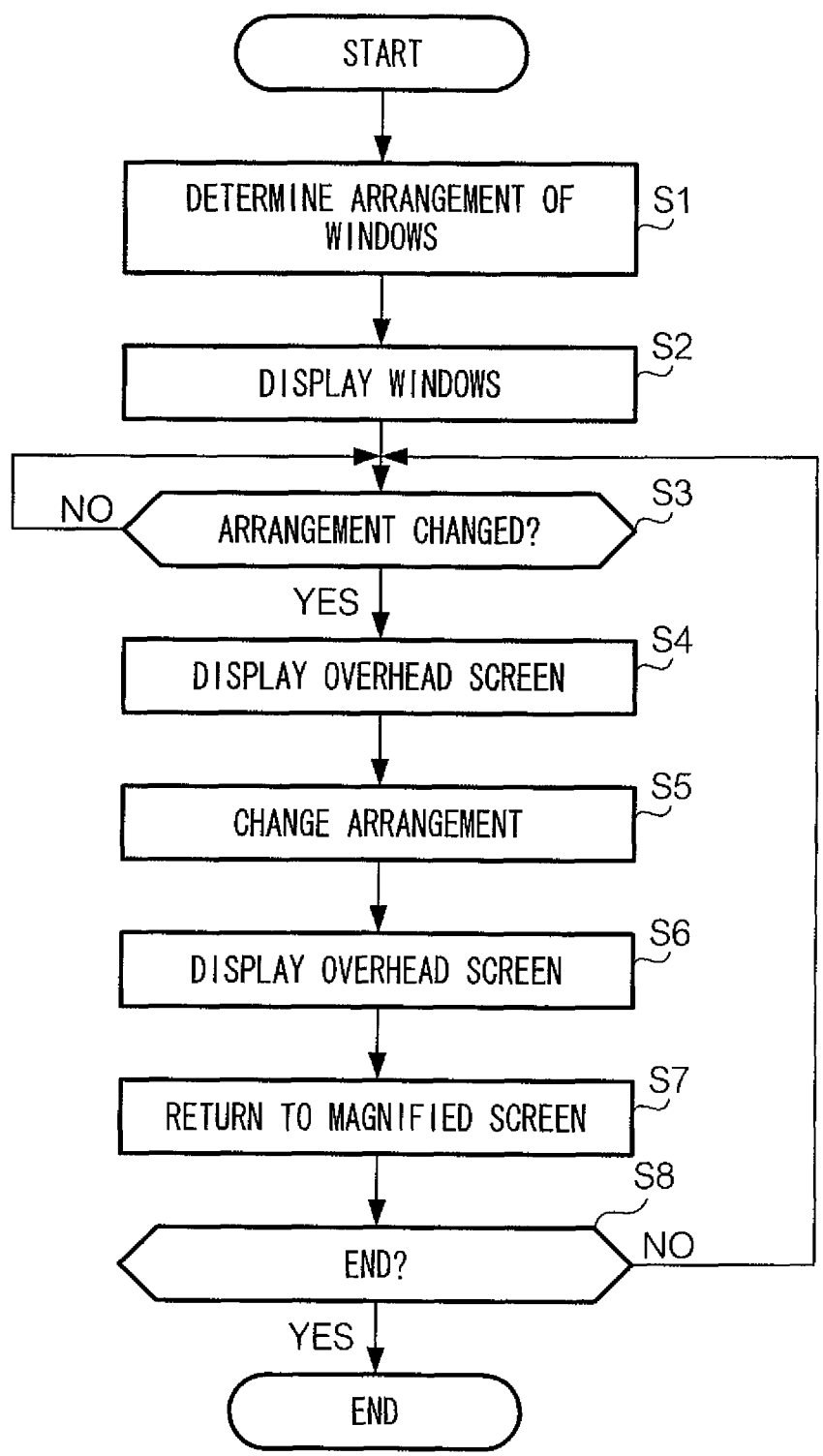
FIG. 5 is a flowchart showing a display control carried out by a communication terminal device.

FIG. 5 is a flowchart showing a display control carried out by control unit 11 having the configuration and functions as in the foregoing description. The operation shown in the flowchart is triggered by execution of the "window display application." Control unit 11 initially determines the arrangement of plural windows in accordance with a predetermined algorithm (step S1). For example, control unit 11 may make the determination on the basis of setting information stored in EEPROM 11d. Alternatively, control unit 11 may arrange windows in an order that widgets were downloaded. Alternatively, control unit 11 may arrange windows on the basis of the number of executions of widgets. Alternatively, control unit 11 may determine the arrangement of the windows using a predetermined random function. In essence, control unit 11 may make the determination in accordance with a predetermined algorithm.

After the arrangement of the plural windows is determined, control unit 11 displays at least a part of the windows on display unit 13 in a size corresponding to a predetermined scale (hereinafter referred to as "first scale") (step 2). Specifically, control unit 11 displays at least a part of an image in which the plural windows are arranged as determined in step S1 (hereinafter referred to as "complete image G1") in a display area of display unit 13 in a size corresponding to the first scale.

Figure 6:
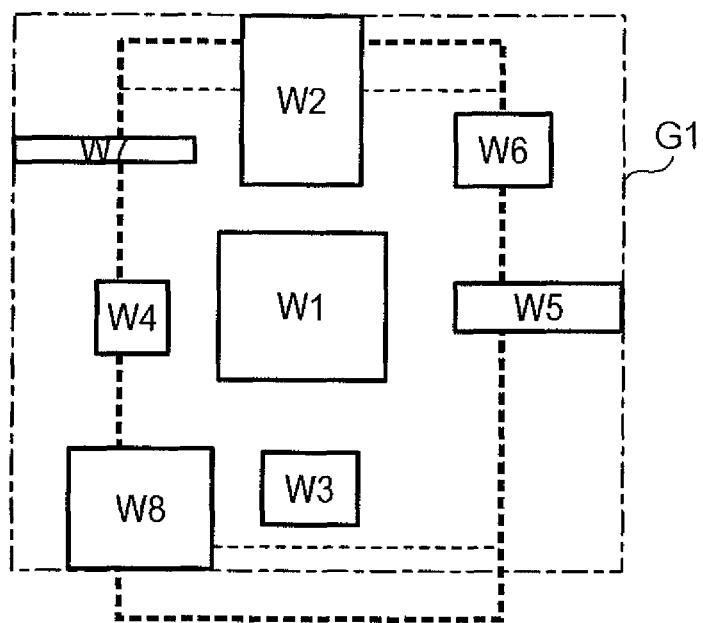
FIG. 6 is a diagram showing an example of a screen displayed on a display unit.
Figure 7:
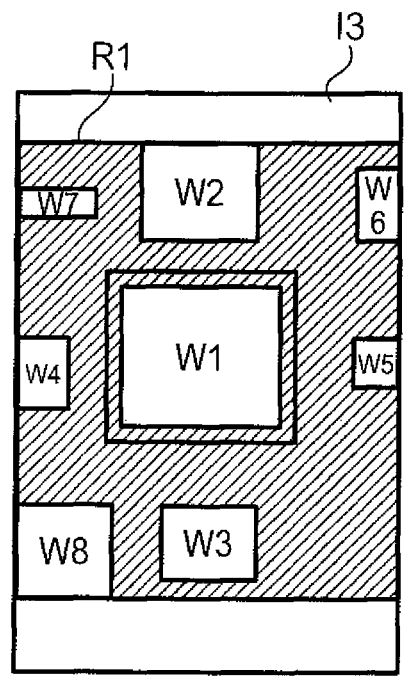
FIG. 7 is a diagram showing an example of a screen displayed on a display unit.

FIG. 6 is a diagram showing an example of complete image G1, and FIG. 7 is a diagram showing an example of a screen displayed on display unit 13 in step S2. FIGS. 6 and 7 show a case in which eight windows W1 to W8 are displayed. As shown in FIGS. 6 and 7, control unit 11 displays complete image G1 in which windows W1 to W8 are arranged as determined in step S1, in display area R1 of display unit 13 in a size corresponding to the first scale. FIG. 7 shows a case in which window W1 is a selected window. As shown in FIG. 7, control unit 11 displays complete image G1 in a size corresponding to the first scale so that all selected windows (in the example shown in FIG. 7, selected window W1) are displayed on display unit 13.

As shown in FIG. 7, in display area R1 of display unit 13, plural windows are displayed. In a situation in which the screen shown in FIG. 7 is displayed, a user is able to change a selected window by using the direction key. Control unit 11 changes a selected window on the basis of operation information output from operation unit 14.

The user is also able to change display positions of windows by using the change key of operation unit 14. Control unit 11 waits until an operation to change display positions of windows is performed (step S3; NO), and if an operation instruction to change display positions of windows is received by operation unit 14 (step S3; YES), control unit 11 displays the windows whose arrangement has been changed, on display unit 13, in a size corresponding to a scale that is smaller than the first scale (hereinafter referred to as "second scale"), and thereafter displays at least a part of the windows whose arrangement has been changed, on display unit 13, in the first scale size (steps S4 to S7). These operations will be described in detail with reference to drawings.

Figure 8:
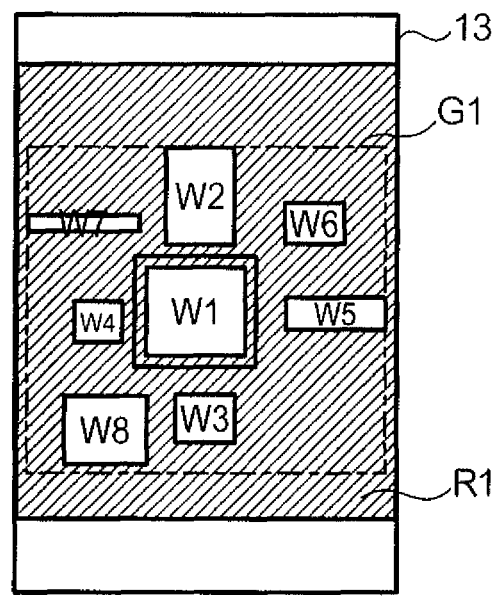
FIG. 8 is a diagram showing an example of a screen displayed on a display unit.

In a situation in which the screen shown in FIG. 7 (namely, a part of complete image G1) is displayed, if operation information directing a change of the arrangement is output from operation unit 14, control unit 11 initially displays an overhead screen in which the currently-displayed screen is overviewed (step S4). Specifically, control unit 11 changes a content of display area R1 so that all of the complete image G1, in which the windows are arranged as determined in step S1, is displayed in display area R1. FIG. 8 is a diagram showing an example of an overhead screen displayed in display area R1 of display unit 13 in step S4. In the example shown in FIG. 8, complete image G1 shown in FIG. 6 is displayed that has been reduced to a size in which all of the complete image G1 can be displayed. In step S4, control unit 11 may change a content of display area R1 by zooming out complete image G1.

Subsequently, control unit 11 changes the arrangement of the plural windows in accordance with a predetermined algorithm (step S5). Specifically, control unit 11 may change the arrangement using a predetermined random function. In essence, control unit 11 may employ any method as long as the control unit changes the arrangement of the plural windows in accordance with a predetermined algorithm.

Figure 9:
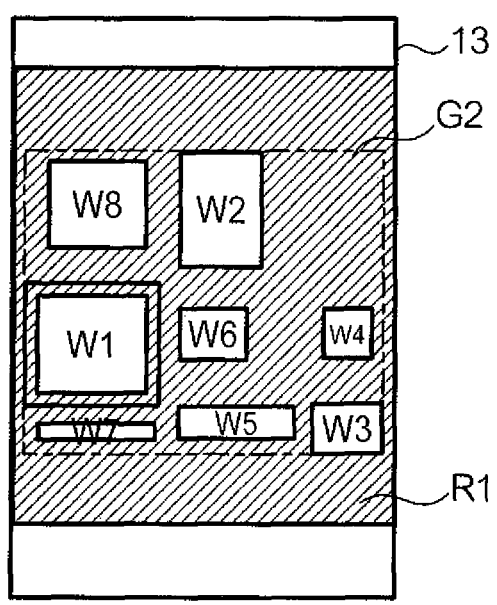
FIG. 9 is a diagram showing an example of a screen displayed on a display unit.

Subsequently, control unit 11 changes the arrangement of the windows in the overhead view shown in FIG. 8 (step S6). Specifically, control unit 11 displays the windows whose arrangement has been changed, on display unit 13, in a size corresponding to the second scale, which is smaller than the first scale. More specifically, control unit 11 changes a content of display area R1 so that all of the image in which the plural windows are arranged as determined in step S5 (hereinafter referred to as "complete image G2") is displayed in display area R1 of display unit 13. FIG. 9 is a diagram showing an example of an overhead screen displayed in display area R1 of display unit 13 in step S6. In the example shown in FIG. 9, complete image G2 in which the arrangement of the windows has been changed is displayed, that has been reduced to a size so that all of the complete image G2 can be displayed.

When the change of displayed content is carried out, control unit 11 may apply an appropriate visual effect to an image displayed. For example, control unit 11 may display an image different from that of a window (e.g., an image showing a message "Please wait" or an image of a sand clock) while the arrangement is being changed. Alternatively, control unit 11 may display images of windows that show in animation a gradual change of the arrangement from a pre-change arrangement to a post-change arrangement. In addition, control unit 11 may generate an appropriate sound for informing a user that a change of displayed content is being carried out. The visual effect may be applied in a given timing during a time period from when the change key is pressed till the arrangement of all displayed windows is determined. According to the configuration, a situation in which an image remains still is avoided even if a determination of the arrangement takes some time.

Figure 10:
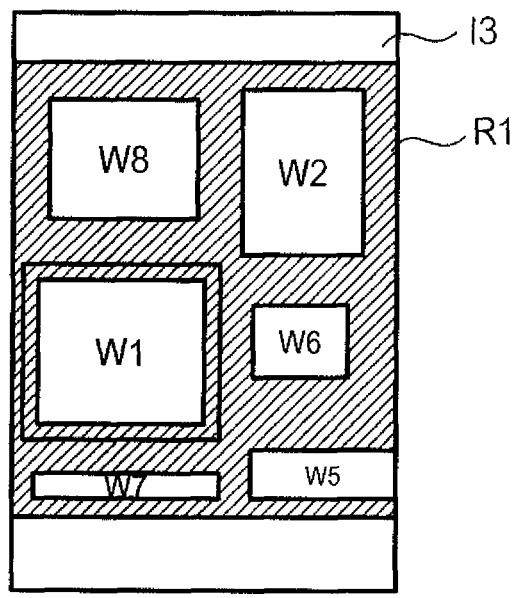
FIG. 10 is a diagram showing an example of a screen displayed on a display unit.
Figure 11:
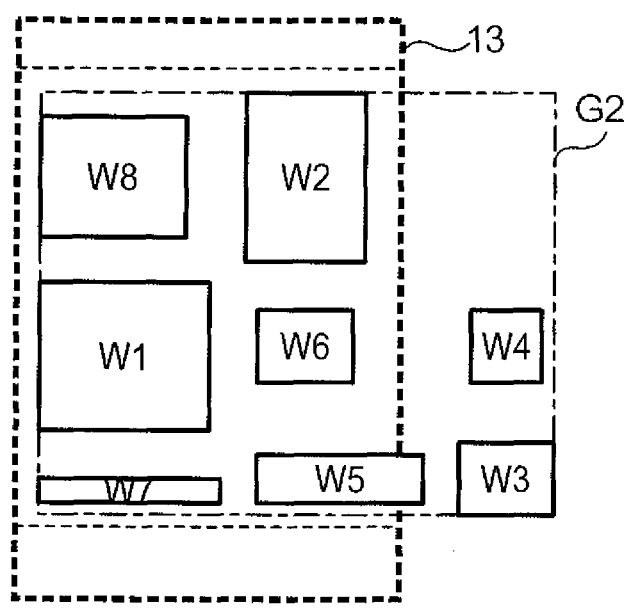
FIG. 11 is a diagram showing an example of a screen displayed on a display unit.

After displaying the overhead image shown in FIG. 9 (namely, displaying the windows whose arrangement has been changed, on display unit 13, in a size corresponding to the second scale), control unit 11 performs an operation to return the screen to a magnified screen (original screen) (step S7). Specifically, control unit 11 displays at least a part of the windows whose arrangement has been changed, on display unit 13 in the first scale size. More specifically, control unit 11 changes a content of display area R1 so that complete image G2 is displayed in display area R1 in a size corresponding to the first scale (step S7). In doing so, control unit 11 may change the content of display area R1 by zooming in complete image G2. If all of the complete image G2 cannot be displayed in display area R1 in the operation of step S7, a part of complete image G2 is displayed in display area R1. FIG. 10 is a diagram showing an example of a screen displayed in display area R1 in step S7. FIG. 11 is a diagram showing an example of complete image G2. As shown in FIGS. 10 and 11, in display area R1, a part of complete image G2 is displayed. Also, as shown in FIG. 10, control unit 11 displays at least a part of complete image G2 so that all selected windows (in the example shown in FIG. 10, selected window W1) are displayed in display area R1.

Control unit 11 determines whether to terminate the window display application (step S8), and if it determines to terminate the application (step S8; YES), control unit 11 terminates running of the application. On the other hand, if control unit 11 determines not to terminate the application (step S8; NO), control unit 11 returns to the operation of step S3. In step S3, control unit 11 waits until an instruction to change the arrangement of the windows is provided, and if an instruction to change the arrangement of the windows is provided (step S3; YES), the control unit performs operations from step S4 to carry out an operation to change the windows.

In a case where operation unit 14 receives an operation instruction to specify a window that is displayed on display unit 13 in a size corresponding to the first scale while the window display application is running (namely, operation unit 14 receives an operation instruction to specify a window that is displayed on display unit 13 in step S2 or S3 of FIG. 5), control unit 11 executes a processing corresponding to the specified window. It is to be noted that in FIG. 5, the operation is not shown so as to avoid complicating the drawing.

By changing the arrangement of the windows using the window display application, it becomes possible to reduce the number of times a user presses keys to select a desired window. Namely, operability for selecting a window is improved. Specifically, for example, in a case where windows are arranged as shown in FIG. 7, to change a selected window from window W2 to window W8, a user has to press the down-arrow button two times and the left-arrow button once. On the other hand, in a case where the arrangement of the windows has been changed to an arrangement shown in FIG. 10 in response to pressing of the change key by a user to change a selected window from window W2 to window W8, all a user has to do is to press the left-arrow button once.

Namely, according to the present embodiment, a user is able to change the arrangement of the windows by just pressing the change key, so an operation becomes easier. The effect of the display control is felt better as the number of windows being displayed increases. Also, the effect of the display control is felt better as the number of times a user has to press the direction keys to select a desired window increases.

It is to be noted that if the number of operations does not decrease after the arrangement is once changed a user may change the arrangement plural times by pressing the change key plural times. In doing so, a user repeatedly presses the same key; accordingly, an operation is easier as compared with a case in which different keys are pressed (for example, a case in which "up," "right," and "up" buttons are pressed).

The foregoing is a description of the display control of the present embodiment. In the present embodiment, in a case where the arrangement of the windows is changed in a list screen, an overhead screen is initially displayed in which the list screen is overviewed. The arrangement of the windows is subsequently changed in the overhead screen, and a magnified screen (original screen) of the overhead screen, in which the arrangement of the windows has been changed, is displayed last, as described in the foregoing. By displaying a magnified image, it is possible to make the windows more visible in a small display area of a mobile phone. Also, in a case where a window exists that cannot be displayed in a magnified screen, by displaying an overhead screen, it becomes possible to cause a user to recognize a fact that a window that cannot be displayed exists in a magnified screen and also recognize a position of the window.

As described in the foregoing, according to the present embodiment, it is possible to reduce the number of times a user must press the keys to select a desired window. Namely, it is possible to improve operability for selecting a window. Also, it is possible to make it easier for a user to recognize the arrangement of all windows when s/he selects a window.

The present invention may be implemented in an embodiment that is different from the above embodiment. For example, the present invention may be implemented in the embodiments described below. It is to be noted that the following modifications may be combined with each other.

Figure 12:
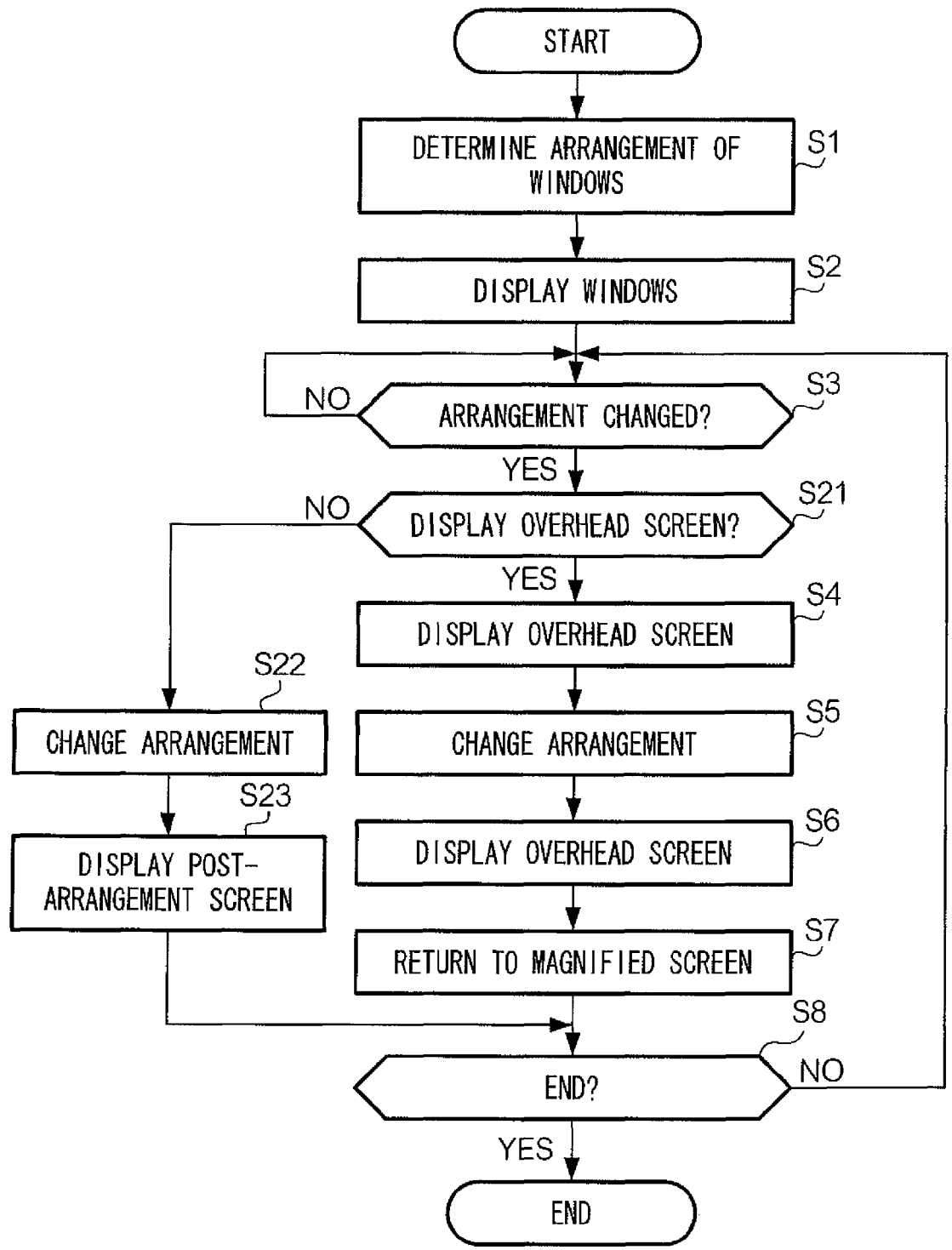
FIG. 12 is a flowchart showing a display control carried out by a communication terminal device.

In the above embodiment control unit 11 may control the display of an overhead screen on the basis of the number of windows. For example, if a single window exists, it is not necessary to have an overview window; therefore, it may be possible that a magnified window is displayed without displaying an overhead screen. On the other hand, if there are too many windows to be displayed in a magnified screen, it may be possible to display sufficient enough area at the outset so as to have an overview of the windows and thereafter proceed to a magnified screen. FIG. 12 shows an example of a flowchart for an operation flow according to the present example. FIG. 12 corresponds to the flowchart of FIG. 5 relating to the above embodiment. The flowchart of FIG. 12 is different from that of FIG. 5 in that the flowchart of FIG. 12 has steps S21, S22, and S23. In the following description, operations shared with FIG. 5 are indicated by like signs, and descriptions of the operations will be omitted.

In the example of FIG. 12, control unit 11 determines whether to display an overhead screen (step S21) before changing the arrangement of the windows (step S3; YES). Specifically, control unit 11 determines whether to display an overhead screen by determining whether all windows whose arrangement has been changed can be displayed on display unit 13 in a size corresponding to the first scale. If all windows can be displayed in a size corresponding to the first scale, control unit 11 determines not to display an overhead screen.

On the other hand, if all windows cannot be displayed in a size corresponding to the first scale, control unit 11 determines to display an overhead screen. If control unit 11 determines to display an overhead screen (step S21; YES), the control unit displays the windows on display unit 13 in a size corresponding to the second scale (step S6), and thereafter displays at least a part of the windows whose arrangement has been changed, on display unit 13 in the first scale size (step S7). Namely, control unit 11 displays a magnified screen after displaying an overhead screen. On the other hand, if control unit 11 determines not to display an overhead screen (step S21; NO), the control unit changes the arrangement of the windows (step S22), and thereafter displays the windows whose arrangement has been changed, on display unit 13 in a size corresponding to the first scale (step S23). Namely, control unit 11, when all windows whose arrangement has been changed can be displayed on display unit 13 in a size corresponding to the first scale, displays the windows in a size corresponding to the first scale without displaying an overhead screen. As described in the foregoing, in the example of FIG. 12, control unit 11 determines whether all windows can be displayed on display unit 13, and if the control unit determines that all windows can be displayed, changes the arrangement of the windows without displaying an overhead screen. On the other hand, if control unit 11 determines that all windows cannot be displayed, the control unit displays an overhead screen before changing the arrangement of the windows.

In step S21 of FIG. 12, control unit 11 may determine whether to display an overhead screen on the basis of the number of windows displayed. Specifically, control unit 11 may display an overhead screen when the number of windows displayed is equal to or greater than a predetermined threshold value, and may not display an overhead screen when the number is smaller than the predetermined threshold value.

Alternatively, control unit 11 may determine whether to display an overhead screen by determining whether all windows whose arrangement has been changed can be displayed. Specifically, control unit 11 may compute an image in which windows are actually arranged, and if all windows cannot be displayed, the control unit may display an overhead screen, and if all windows can be displayed, the control unit may not display an overhead screen.

Alternatively, control unit 11 may determine whether to display an overhead screen on the basis of the sizes of the windows. For example, control unit 11 may calculate the total boundary length of the windows, and if the calculated length is equal to or greater than a threshold value, the control unit may display an overhead screen, and if the calculated length is smaller than the threshold value, the control unit may not display an overhead screen. Alternatively, control unit 11 may calculate the total area of the windows, and if the calculated area is equal to or greater than a threshold value, the control unit may display an overhead screen, and if the calculated area is smaller than the threshold value, the control unit may not display an overhead screen.

Alternatively, control unit 11 may determine whether to display an overhead screen on the basis of an operation by a user. For example, control unit 11 may display an overhead screen when the change key is clicked once or pressed for an extended period, and may not display an overhead screen when the change key is clicked two times. To realize the present configuration, it may be required that operation type information, which indicates a type of operation performed by a user, and a flag, which indicates whether an overhead screen should be displayed, are pre-stored in a memory such as EEPROM 11*d*. If an operation is performed by a user, control unit 11 may identify the type of the operation on the basis of a signal output from operation unit 14, and determine whether to display an overhead screen on the basis of the identified type and content of the memory.

In the above embodiment, the second scale, which is used when control unit 11 displays windows in an overhead screen may be of a fixed value or a variable value. Specifically, control unit 11 may change a scale by use of which all windows are displayed in an overhead screen, depending on the number or the arrangement of the windows. Alternatively, control unit 11 may always display windows in an overhead screen in a size corresponding to a fixed scale.

Figure 13:
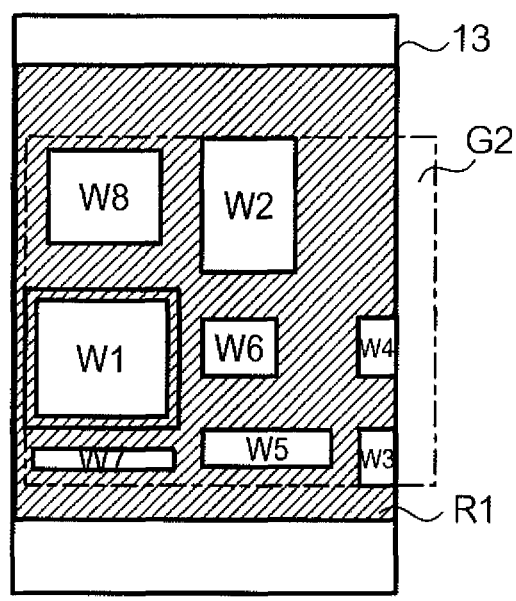
FIG. 13 is a diagram showing an example of a screen displayed on a display unit.

In the example of FIG. 9 of the above embodiment, control unit 11 displays plural windows in a scale size so that all windows (entire windows) are displayed in display area R1 of display unit 13. However, in the above embodiment, control unit 11 may display an overhead screen in a scale size such that at least a part of each of the windows is displayed, as shown in FIG. 13.

The essence is that control unit 11 displays windows in a size corresponding to a scale that is smaller than the first scale when displaying an overhead screen.

In the above embodiment, control unit 11 may change a time period for which an overhead screen is displayed, depending on the displayed content. For example, control unit 11 may lengthen a time period in which an overhead screen is displayed, in proportion to the number of windows displayed. Alternatively, control unit 11 may lengthen a display time of an overhead screen in proportion to a difference between the first scale and the second scale. The essence is that control unit 11 lengthens a display time of an overhead screen in proportion to a degree of difficulty that a user has in recognizing the arrangement of all windows.

Alternatively, it may be possible to change a time period for which an overhead screen is displayed, depending on an operation by a user. For example, control unit 11 may display an overhead screen while a user presses the change key for an extended period. More specifically, control unit 11 may display an overhead screen while a user presses the change key for an extended period, and if the user releases the key, the control unit may change the overhead screen to a magnified screen.

Alternatively, it may be possible to change a display time of an overhead screen depending on an amount of change in the arrangement of the windows. Specifically, control unit 11 may lengthen a display time of an overhead screen in proportion to an amount of movement of windows whose arrangement has been changed. More specifically, control unit 11 may calculate an amount of movement for each window whose arrangement has been changed, and lengthen a display time of an overhead screen in proportion to the total of the calculated amounts of movement.

A speed at which an overhead screen is changed back to a magnified screen may be changed. Alternatively, a time period taken for changing an overhead screen back to a magnified screen may be changed. For example, control unit 11 may slow down the speed in proportion to the number of windows displayed. Alternatively, control unit 11 may slow down the speed in proportion to the total area of windows. Alternatively, control unit 11 may slow down the speed in proportion to a difference between the first scale and the second scale. In essence, control unit 11 may slow down the speed so that a time period in which an overhead screen is displayed is lengthened in proportion to a degree of difficulty that a user has in recognizing the arrangement of all windows.

Alternatively, control unit 11 may change a speed at which an overhead screen is changed back to a magnified screen (or a time period taken for changing an overhead screen back to a magnified screen) in accordance with an operation by a user. Specifically, control unit 11 may slow down the speed when the change key has been pressed for an extended period.

Alternatively, control unit 11 may change a speed at which an overhead screen is changed back to a magnified screen (or a time period taken for changing an overhead screen back to a magnified screen) depending on an amount of change in the arrangement of the windows. Specifically, control unit 11 may calculate an amount of movement for each window whose arrangement has been changed, and slow down the speed so that a time period in which an overhead screen is displayed is lengthened in proportion to a total of the calculated amounts of movement.

In the above embodiment, an image indicating an attribute of a widget such as a communication situation or a communication type (secure/non-secure) may be displayed adjacent to or on a window corresponding to the widget. An attribute may include a status of application, a type of application, and a communication connection status, in addition to the communication situation and the communication type. To realize the present modification, attribute data indicating attributes of a widget is pre-stored for each widget in ROM 11b or EEPROM 11d. Control unit 11 retrieves attribute data indicating an attribute of a widget from ROM 11b or EEPROM 11d, and displays an image indicating the attribute corresponding to the retrieved attribute data, adjacent to or on a window.

An arrangement changing operation according to the present invention only needs a change in relative positional relation between a selected window and a non-selected window. Accordingly, all windows being displayed may be moved, or alternatively a part of the windows being displayed may be moved. For example, in an arrangement changing operation according to the present invention, positions of only non-selected windows surrounding a selected window may be changed, while a position of the selected window is not changed. Even if a position of a selected window is not changed, a desired non-selected window can be located closer to the selected window so that the number of operations performed by a user for selecting the non-selected window is reduced. In the example, a position of a part of non-selected windows may not be changed.

The above embodiment is an embodiment in which overlapping of windows is avoided. However, the present invention may be implemented in an embodiment in which windows are overlapped with each other. Namely, the present invention can be implemented in a system of overlapping windows. Also, the present invention can be applied to a so-called tiling window system in which plural windows are displayed side-by-side. When the present invention is applied to a tiling window system, adjacent windows may be arranged with no space between them.

A window according to the present invention may be not only a display area assigned to a "widget" of the above embodiment, but also a display area assigned to another application such as a native application. Also, a widget may be not only a Java application, but also another application. Also, in the above embodiment where display of plural windows is enabled by executing a window display application, which is a Java application, display of plural windows may be enabled by another application such as an OS.

Also, a widget may obtain information via a means other than wireless communication unit 12. For example, if an information-processing device according to the present invention has a so-called IC tag, a widget may obtain information stored in the IC tag. Alternatively, if an information-processing device according to the present invention has a GPS positioning function, a widget may obtain location information (a latitude and longitude or a distance from a given point) using the positioning function.

An object image according to the present invention may be not only a window, but also an icon enabling a shortcut to an application, or a thumbnail image of an image or document file stored in EEPROM 11d of communication terminal device 10. Alternatively, an object image according to the present invention may be a web clip, which is an iconized web page, or an icon enabling a shortcut to a telephone number. An object image according to the present invention may be a still image or a moving image, and may include a character or a symbol. In essence, an object image according to the present invention is an image displayed on display unit 13 of communication terminal device 10, which can be selected by a user by operating operation unit 14, and causes control unit 11 to carry out a corresponding operation when the image is specified. Taking an example in which an object image is a thumbnail image, if a thumbnail image is selected, control unit 11 carries out an operation to display an image on display unit 13, which is indicated by the selected thumbnail image. Taking another example in which an object image is a web clip, if a web clip is selected, control unit 11 carries out an operation to access and display a web page indicated by the selected web clip.

In the above embodiment, a magnified screen is displayed again after the arrangement of the windows is changed. Namely, in the above embodiment, control unit 11 carries out an operation of step S7 shown in FIG. 5 after carrying out an operation of step S6. However, in the above embodiment, a magnified screen may be displayed again while the arrangement of the windows is being changed. Specifically, control unit 11 may display content in the display area in animation in which a magnified screen is again displayed while the arrangement of the windows is being changed. In this case, control unit 11 changes positions of windows while gradually reducing the scale, which is smaller than the first scale. Even in this case, control unit 11 displays at least a part of each of the plural windows in a size corresponding to the first scale, and if operation unit 14 receives an operation instruction to change positions of windows, control unit 11 displays the plural windows whose arrangement has been changed on display unit 13 in a scale size that is smaller than the first scale size, and thereafter displays at least a part of each of the plural windows whose arrangement has been changed on display unit 13 in the first scale size, as in the case of the above embodiment.

In the above embodiment, a user inputs instructions by operating keys of operation unit 14. However, soft keys may be displayed on display unit 13, which correspond to keys of operation unit 14, and may be used to input instructions. Alternatively, if communication terminal device 10 has a touch panel, soft buttons on the touch panel may be used as operation keys.

In the above embodiment, control unit 11 may be deemed as corresponding to an information-processing device according to the present invention, and communication terminal device 10 may be deemed as corresponding to the information-processing device. An operation according to the present invention may be not only a pressing of a key, but also recognition of a vocal instruction.

The above embodiment is an embodiment in which the present invention is applied to a mobile phone. However, the present invention may be applied to another electronic device. The present invention may be applied to a communication terminal device such as a PDA (Personal Digital Assistance), or an information-processing device such as a camera, a portable music player, or a portable game device.

The functions shown in FIG. 3, which are realized by communication terminal device 10, may be realized by a collection of programs or cooperation of plural hardware resources. For example, an operation corresponding to display control unit 230 and operations corresponding to operation information obtaining unit 210 and selection unit 220 may be carried out by different programs. Alternatively, the operations may be carried out by different hardware resources.

What is claimed is:

1. An information-processing device comprising:
a computer processor for causing a display unit to display in a display area at least a part of an object image group including plural object images in a size corresponding to a first scale, wherein:
at least one of the plural object images overlaps at least another of the plural object images displayed in the display area;
each of the plural object images is a window assigned to a widget,
a first operation mode is carried out when the window assigned to the widget is selected, and a second operation mode is carried out when the window assigned to the widget is not selected; and
the computer processor:
(a) carries out a first processing for causing the display unit to display in the display area a first arrangement of the object image group in which relative positional relation in a planar direction of the plural object images in relation to a first selected window has not been changed, in a size corresponding to a second scale that is smaller than the first scale, a size of all of the plural object images in the object image group being reduced when displayed in the second scale size within the display area;
(b) thereafter carries out a second processing for causing the display unit to display in the display area, in the second scale size, a second arrangement of the object image group in which the relative positional relation in the planar direction of the plural object images in relation to the first selected window has been changed; and
(c) thereafter carries out a third processing for causing the display unit to randomly display in the display area a third arrangement, in the first scale size, of a portion of the object image group of the second arrangement; and
the computer processor, in response to a single selection of a key by a user received by the information-processing device, carries out the first processing, the second processing, and the third processing; and
the computer processor, in response to an operation instruction by a user received by the information-processing device to select a second selected window of an object image included in the third arrangement of the portion of the object image group in the display area in the first scale size, executes a processing corresponding to the second selected window.

2. An information-processing device according to claim 1, wherein the computer processor determines whether all the plural object images of the object image group including the object image whose display position has been changed, can be displayed on the display unit in the first scale size, and in response to the determination being negative, carries out the first processing, the second processing, and the third processing.

3. An information-processing device according to claim 1, wherein:
the computer processor selects at least one of the plural object images; and
the computer processor displays at least a part of the object image group so that all object images that have been selected by the computer processor are displayed on the display unit.

4. A non-transitory computer readable medium embodying a computer program product, for causing a computer to carry out:
(a) causing a display unit for displaying an image, to display in a display area at least a part of an object image group including plural object images in a size corresponding to a first scale, at least one of the plural object images overlaps at least another of the plural object images displayed in the display area, each of the plural object images is a window assigned to a widget, a first operation mode is carried out when the window assigned to the widget is selected, and a second operation mode is carried out when the window assigned to the widget is not selected;
(b) a first processing for causing the display unit to display in the display area a first arrangement of the object image group in which relative positional relation in a planar direction of the plural object images in relation to a first selected window has not been changed, in a size corresponding to a second scale that is smaller than the first scale, a size of all of the plural object images in the object image group being reduced when displayed in the second scale size within the display area;
(c) a second processing, subsequent to step (b), for causing the display unit to display in the display area, in the second scale size, a second arrangement of the object image group in which the relative positional relation in the planar direction of the plural object images in relation to the first selected window has been changed;
(d) a third processing, subsequent to step (c), for causing the display unit to randomly display in the display area a third arrangement, in the first scale size, of a portion of the object image group of the second arrangement; and
in response to an operation instruction by a user received by the computer to select a second selected window of an object image included in the third arrangement of the portion of the object image group displayed in the display area in the first scale size, executing a processing corresponding to the second selected window, the steps (b), (c), and (d) being carried out in response to a single selection of a key by a user received by the computer.

5. An information-processing device according to claim 1, wherein the plural object images are arranged in an order that applications corresponding to the plural object images are downloaded.

6. An information-processing device according to claim 1, wherein arrangement of the plural object images is determined based on number of executions of each of applications corresponding to the plural object images.

7. An information-processing device according to claim 1, wherein arrangement of the plural object images is determined using a predetermined random function.

8. An information-processing device according to claim 1, wherein the computer processor changes the arrangement of the object image group, using a predetermined random function.

9. An information-processing device according to claim 1, wherein the computer processor determines whether a number of the plural object images is equal to or greater than a predetermined threshold value, and in response to the determination being affirmative, carries out the first processing, the second processing, and third processing.

10. An information-processing device according to claim 1, wherein the computer processor calculates a total boundary length of the plural object images, determines whether the calculated length is equal to or greater than a threshold value, and in response to the determination being affirmative, carries out the first processing, the second processing, and the third processing.

11. An information-processing device according to claim 1, wherein the computer processor calculates a total area of the plural object images, determines whether the calculated area is equal to or greater than a threshold value, and in response to the determination being affirmative, carries out the first processing, the second processing and the third processing.

12. An information-processing device according to claim 1, wherein a time period in which the object image group is displayed in the second scale size is determined based on number of the plural object images.

13. An information-processing device according to claim 1, wherein a time period in which the object image group is displayed in the second scale size is determined based on a difference between the first scale and the second scale.

14. An information-processing device according to claim 1, wherein a time period in which the object image group is displayed in the second scale size is determined based on an amount of the change in arrangement of the plural object images.

15. An information-processing device according to claim 1, wherein a time period taken for changing the object image group displayed in the second scale size to the object image group displayed in the first scale size is determined based on number of the plural object images.

16. An information-processing device according to claim 1, wherein a time period taken for changing the object image group displayed in the second scale size to the object image group displayed in the first scale size is determined based on a total area of the plural object images.

17. An information-processing device according to claim 1, wherein a time period taken for changing the object image group displayed in the second scale size to the object image group displayed in the first scale size is determined based on a difference between the first scale and the second scale.

18. An information-processing device according to claim 1, wherein a time period taken for changing the object image group displayed in the second scale size to the object image group displayed in the first scale size is determined based on an amount of the change in arrangement of the plural object images.

19. A non-transitory computer readable medium according to claim 4, further comprising determining whether a number of the plural object images is equal to or greater than a predetermined threshold value, and in response to the determination being affirmative, carrying out the first processing, the second processing, and the third processing.

20. A non-transitory computer readable medium according to claim 4, further comprising:
   calculating a total boundary length of the plural object images; and
   determining whether the calculated length is equal to or greater than a threshold value; and
   in response to the determination being affirmative, carrying out the first processing, the second processing, and the third processing.

21. A non-transitory computer readable medium according to claim 4, further comprising:
   calculating a total area of the plural object images; and
   determining whether the calculated area is equal to or greater than a threshold value, and
   in response to the determination being affirmative, carrying out the first processing, the second processing, and the third processing.

* * * * *